F. C. MOSIER.
POULTRY DRINKING VESSEL.
APPLICATION FILED MAR. 12, 1915.

1,166,534.

Patented Jan. 4, 1916.

Witnesses

F. C. Mosier
Inventor by
Attorneys

UNITED STATES PATENT OFFICE.

FRANK C. MOSIER, OF PITTSTON, PENNSYLVANIA.

POULTRY DRINKING VESSEL.

1,166,534.  Specification of Letters Patent.  Patented Jan. 4, 1916.

Application filed March 12, 1915. Serial No. 13,889.

*To all whom it may concern:*

Be it known that I, FRANK C. MOSIER, a citizen of the United States, residing at Pittston, in the county of Luzerne and State of Pennsylvania, have invented a new and useful Poultry Drinking Vessel, of which the following is a specification.

This invention relates to a poultry drinking vessel and more especially to a heating attachment specially designed for use in pails, buckets or other receptacles employed for holding water to be supplied to poultry, one of the objects being to provide a simple form of heater which can be placed readily within a receptacle such as a pail, dishpan or the like.

A further object is to provide a heater which is simple, durable and efficient, cheap to manufacture, and which operates efficiently for a considerable period to prevent the surrounding water from freezing when exposed in the coldest weather.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
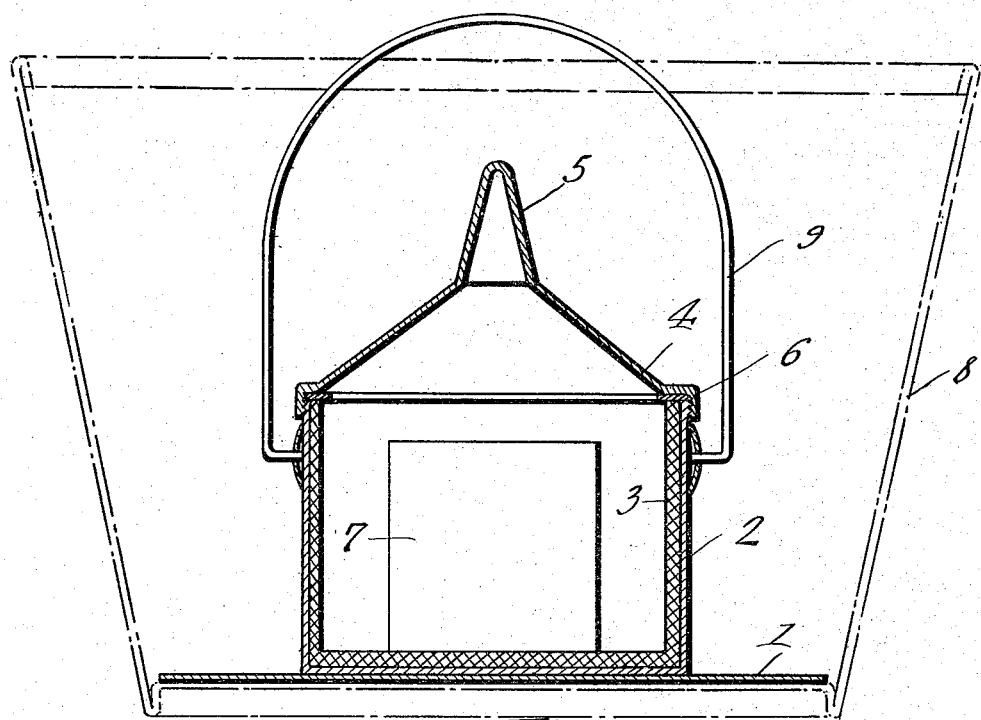
Figure 2:
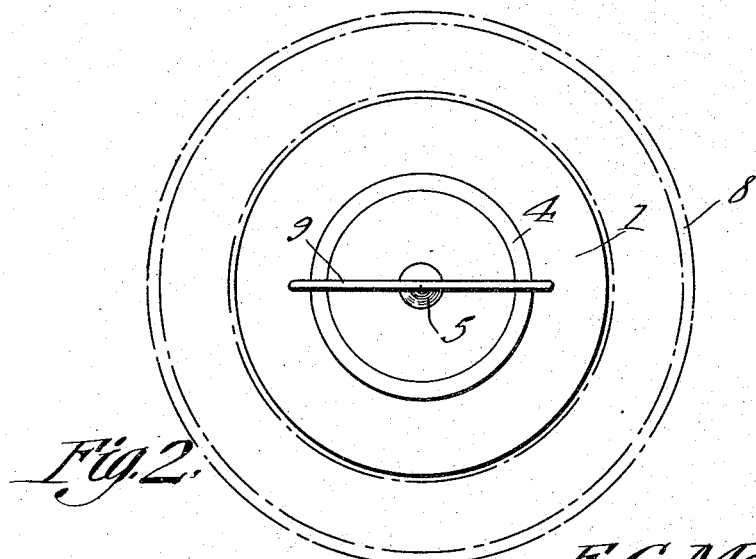

In said drawings:—Figure 1 is a central vertical section through the heater, the same being shown in position in a pail, illustrated by dotted lines. Fig. 2 is a plan view on a reduced scale of the structure shown in Fig. 1.

Referring to the figures by characters of reference, 1 designates a disk on the central portion of which is secured, by solder or other means, a heater casing 2 which can be cylindrical, as shown. Said casing may be lined with asbestos or other suitable material, as shown at 3. The casing is adapted to be engaged by a closure 4 which, in the present instance, is funnel-shaped, the stem 5 of the closure projecting upwardly and being closed. The cover 4 can be attached to the casing 2 by screwing it onto the casing or in any other desired manner. If desired, any suitable arrangement of packing may be interposed between the upper end of the casing 2 and the closure, as shown at 6 so as to still further prevent leakage.

Arranged within the casing 2 is a block 7 of soapstone or other suitable heat retaining material, and this block constitutes a weight to hold the heater partly or entirely submerged in a water receptacle 8.

In using the structure herein described the block 7 is heated to a high temperature after which it is placed in the casing 2 and the closure 4 is put in position. The disk 1 and casing 2 are then lowered into the pail or receptacle 8. Said receptacle 8 is then partly filled with water and the heat radiating from the block 7 will raise the temperature of the casing 2 and its closure 4 so that the heat will be conducted to the surrounding water and the temperature of the water thus kept comparatively high so that freezing will be prevented. A bail 9 may be connected to the casing 2 to facilitate the handling thereof.

Importance is attached to the fact that the heater constitutes an article complete in itself which can be readily placed in a wash basin, pail or the like, and does not require the use of a special form of water container.

By providing a closure 4 such as described, an extensive heating area is presented to the water in receptacle 8. By employing the lining 3, the radiation of heat from the wall of the casing 2 is retarded so that the heat within the casing is retained for a greater length of time than would otherwise be the case.

While the device herein described is especially designed for keeping water in a warm condition it is to be understood that it can also be employed for keeping food warm.

What is claimed is:—

1. A heating attachment for receptacles, comprising a bottom plate constituting a centering means, a casing thereon, a closure at the top of the casing, and a heat retaining object removably mounted within the casing.

2. As an article of manufacture, a heater for receptacles, comprising a bottom plate, a casing, a lining within the casing, an object removably mounted in the casing and consisting of heat retaining material, and a closure detachably engaging the casing and having an upstanding tubular stem closed at its upper end.

3. As an article of manufacture, a heater for receptacles, comprising a bottom plate, a casing thereon, a lining within the casing, an object removably mounted in the casing and consisting of heat retaining material, and a closure detachably engaging the casing and having the form of an inverted funnel.

4. The combination with a receptacle, of a combined centering and bottom plate removably mounted therein, a casing fixed on the plate, a closure at the top of the casing, and a heating medium within the casing.

In testimony that I claim the foregoing as my own, I have hereto affixed my signature in the presence of two witnesses.

FRANK C. MOSIER.

Witnesses:
 JOSEPH F. COHAN,
 S. S. DENNETT.

Copies of this patent may be obtained for five cents each, by addressing the "Commissioner of Patents, Washington, D. C."